United States Patent
Liu et al.

(10) Patent No.: US 11,644,975 B2
(45) Date of Patent: May 9, 2023

(54) SOFTWARE-DEFINED STORAGE INFORMATION IN VIEW OF AVAILABLE HARDWARE RESOURCES

(71) Applicant: VMware, Inc., Palo Alto, CA (US)

(72) Inventors: Sifan Liu, Shanghai (CN); Jin Feng, Shanghai (CN); Yu Wu, Shanghai (CN); Denitsa Borislavova Tsvetkova, Sofia (BG); Georgi Stoyanov Georgiev, Sofia (BG); Lachezar Petkov Petkov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/193,116

(22) Filed: Mar. 5, 2021

(65) Prior Publication Data
US 2022/0229556 A1    Jul. 21, 2022

Related U.S. Application Data

(63) Continuation of application No. PCT/CN2021/073063, filed on Jan. 21, 2021.

(51) Int. Cl.
| | |
|---|---|
| *G06F 3/06* | (2006.01) |
| *G06F 9/54* | (2006.01) |
| *G06F 9/455* | (2018.01) |
| *G06F 3/14* | (2006.01) |

(52) U.S. Cl.
CPC .......... *G06F 3/0604* (2013.01); *G06F 3/0629* (2013.01); *G06F 3/0679* (2013.01); *G06F 3/14* (2013.01); *G06F 9/45558* (2013.01); *G06F 9/544* (2013.01); *G06F 2009/45583* (2013.01)

(58) Field of Classification Search
CPC .. G06F 3/0604; G06F 3/0629; G06F 9/45558; G06F 9/544; G06F 2009/45583
See application file for complete search history.

(56) References Cited

U.S. PATENT DOCUMENTS

| | | | |
|---|---|---|---|
| 2008/0195581 A1* | 8/2008 | Ashmore | G06F 12/0646 |
| 2017/0147458 A1* | 5/2017 | Epstein | G06F 3/0619 |
| 2022/0173977 A1* | 6/2022 | Asaoka | H04L 41/22 |

* cited by examiner

*Primary Examiner* — Edward J Dudek, Jr.

(57) ABSTRACT

Described herein are systems, methods, and software to generate user interfaces to indicate software-defined storage information in view of available hardware resources. In one example, a user interface service may obtain enclosure information associated with enclosures in a computing environment and may determine a storage overview for the plurality of enclosures based on the enclosure information. The user interface service may further determine a function for each storage device in the storage overview in relation to a software-defined storage configuration for the computing environment and generate a user interface to indicate the storage overview with the function for each storage device in the plurality of enclosures.

18 Claims, 7 Drawing Sheets

SOFTWARE-DEFINED STORAGE INFORMATION IN VIEW OF AVAILABLE HARDWARE RESOURCES

RELATED APPLICATIONS

This application is a continuation of and claims benefit from and priority to PCT Application Serial No. PCT/CN2021/073063 filed in China entitled "SOFTWARE-DEFINED STORAGE INFORMATION IN VIEW OF AVAILABLE HARDWARE RESOURCES", on Jan. 21, 2021, which is herein incorporated in its entirety by reference for all purposes.

TECHNICAL BACKGROUND

In a computing environment, multiple enclosures or boxes may be used to support the hardware required for the operations of the computing environment. This hardware may include processors, memory, storage devices (solid state devices, hard disks, tape drives, or some other storage device), networking adapters, or some other hardware component. In some implementations, the storage devices located in each of the enclosures may be joined as part of a software-defined storage environment, wherein the software-defined storage environment abstracts the local storage in each of the enclosures and makes a pool of storage accessible to processing systems in the computing environment. The processing systems may be used to execute virtual nodes, such as virtual machines or containers, that are stored in the pooled storage, provide database storage, or provide some other form of pooled storage.

However, while software-defined storage can provide an efficient mechanism to provide data to processing systems in a computing environment, difficulties can arise in managing the hardware in conjunction with software-defined storage. These difficulties may include identifying how the storage devices are allocated in the software-defined storage environment, the locations of the storage devices in the environment, any errors associated with the storage devices, or some other information about the software-defined storage configuration.

SUMMARY

The technology described herein provides software-defined storage information in view of available hardware resources. In one implementation, a user interface service obtains enclosure information associated with a plurality of enclosures and determines a storage overview for the plurality of enclosures based on the enclosure information, wherein the storage overview indicates whether storage slots on each of the plurality of enclosures are occupied or empty. The user interface service further determines, for each occupied storage slot in the plurality of enclosures, a function for a storage device in the occupied storage slot in relation to a software-defined storage configuration. The user interface service also generates a user interface to indicate the storage overview with the function for each occupied storage slot in the plurality of enclosures.

DETAILED DESCRIPTION

Figure 1:
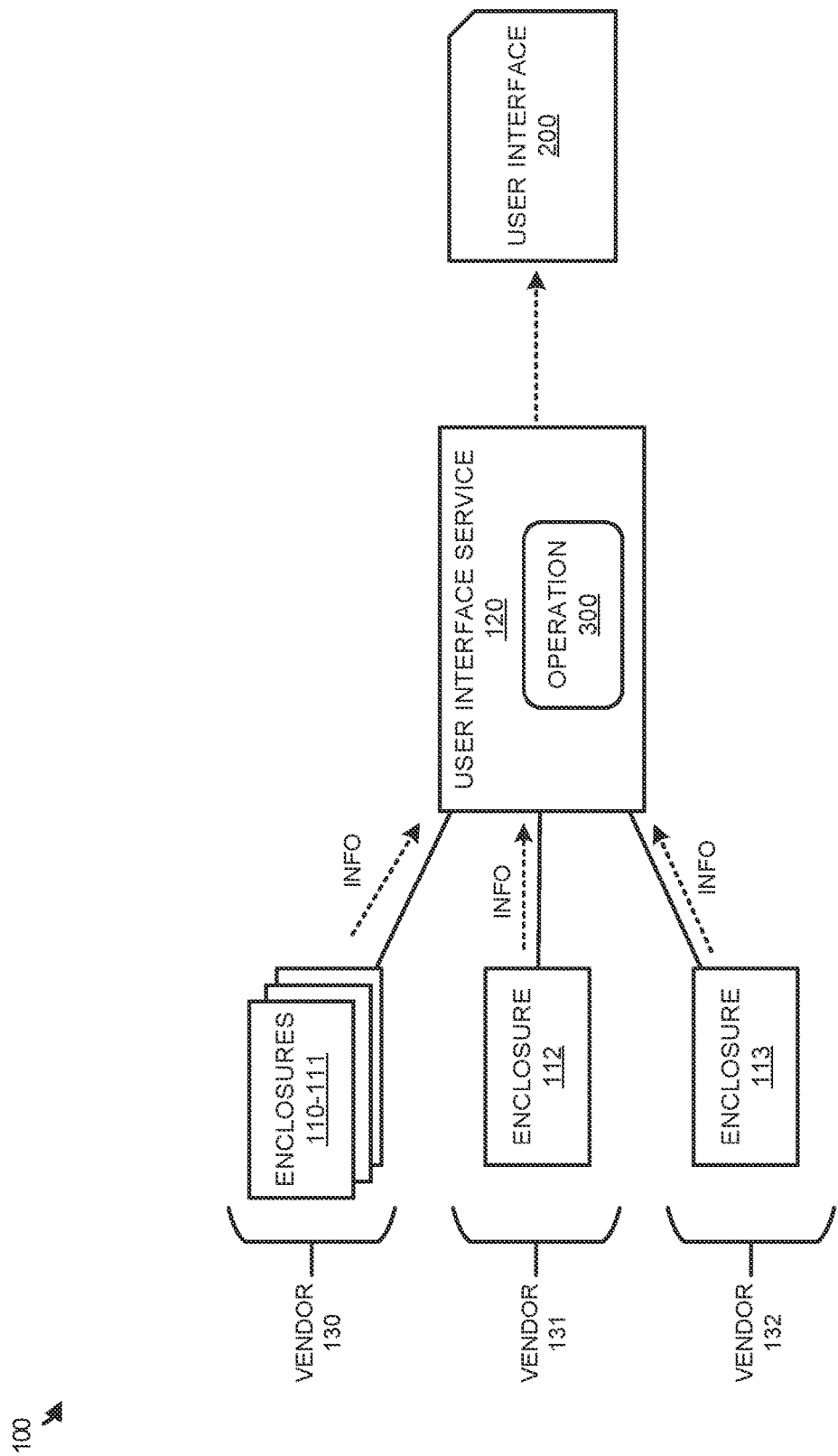
FIG. 1 illustrates a computing environment to generate a display of resources for a software-defined storage environment according to an implementation.

FIG. 1 illustrates a computing environment 100 to generate a display of resources for a software-defined storage environment according to an implementation. Computing environment 100 includes enclosures 110-113 that each correspond to a vendor from vendors 130-132. Computing environment 100 further includes user interface service 120 that generates user interface 200. An example of user interface 200 is demonstrated further in FIG. 2, while user interface service 120 provides operation 300 that is further described with reference to FIG. 3. Although demonstrated with multiple vendors, it should be understood that a computing environment may use a single vendor in some examples.

In operation, user interface service 120 obtains enclosure information associated with enclosures 110-113. User interface service 120 may execute on a standalone computing system, such as a desktop or server computing system, or may execute at least partially on a processing system on enclosures 110-113. To obtain the information, user interface service 120 may use one or more Application Programming Interfaces (APIs) to provide hardware information associated with each of the enclosures. The hardware information may include an enclosure type for the enclosure, the available storage slots in the enclosure, the occupied storage slots in the enclosure, the type and capacity of the storage device in the occupied storage slot, wherein the storage device may comprise a hard disk, a solid state drive, a tape drive, or some other storage device, or some other hardware information related to the enclosure. In some examples, different API commands or formats may be used to obtain the information from enclosures associated with each vendor of vendors 130-132, wherein the request and/or responses from the vendors may require a different API format.

Once the enclosure information is obtained by user interface service 120, user interface service 120 may store the information in a unified format that is non-specific to the vendor associated with the enclosure. The unified format may include an identifier for any of the enclosures, any or all available storage slots in the enclosure, any or all occupied storage slots in the enclosure, and the physical location of any or all available or occupied storage slots in the enclosure (i.e., the front or the back of the enclosure). The unified format may comprise one or more data structures, such as tables, linked lists, arrays, or some other data structure. In some implementations, at least a portion of the information in the unified format may be derived from a database, wherein the database may include attributes associated with a particular enclosure type. For example, when queried, enclosure 112 may indicate an enclosure type. From the enclosure type, user interface service 120 may reference the database to identify the physical location of the available storage slots of the enclosure. Thus, rather than receiving all of the information from the enclosures directly, at least a portion of the information for a storage summary may be derived from a database accessible by user interface service 120.

Once the enclosure information is obtained, user interface service 120 may generate user interface 200 to display a storage overview associated with enclosures 110-113. The storage overview may provide information about the total number of available storage slots on each of the enclosures, the slots that are occupied on each of the enclosures and may further provide information about where available slots are located on the enclosure (i.e., front or back of the enclosure). User interface 200 may further provide information about the available storage devices, such as the size, manufacturer, or some other information, or may provide function information for the storage device in relation to software-defined storage configuration. The function information may indicate that a storage device is a capacity storage device, a cache storage device, an unclaimed storage device, an ineligible storage device for the software-defined storage configuration, or some other function information associated with the software-defined storage configuration. In some examples, at least a portion of the function information may be derived from the hypervisors or a hypervisor management service associated with the computing environment, wherein the hypervisors or hypervisor management service may provide information about the function of each of the storage devices in relation to the software-defined storage configuration. In some examples, user interface 200 may include visual representations of each of the enclosures with visual representations of the included hardware, however, user interface 200 may include tables or other illustrative elements to indicate at least the hardware configuration associated with a computing environment. In some implementations, the software defined storage is representative of hyperconverged software-defined storage that can be used to provide a data store or pool for virtual machines (e.g., virtual machine disks). Examples of hyperconverged software-defined storage may include VMware vSAN™, Red Hat Ceph Storage™, or some other software-defined storage pool for virtual machines.

Figure 2:
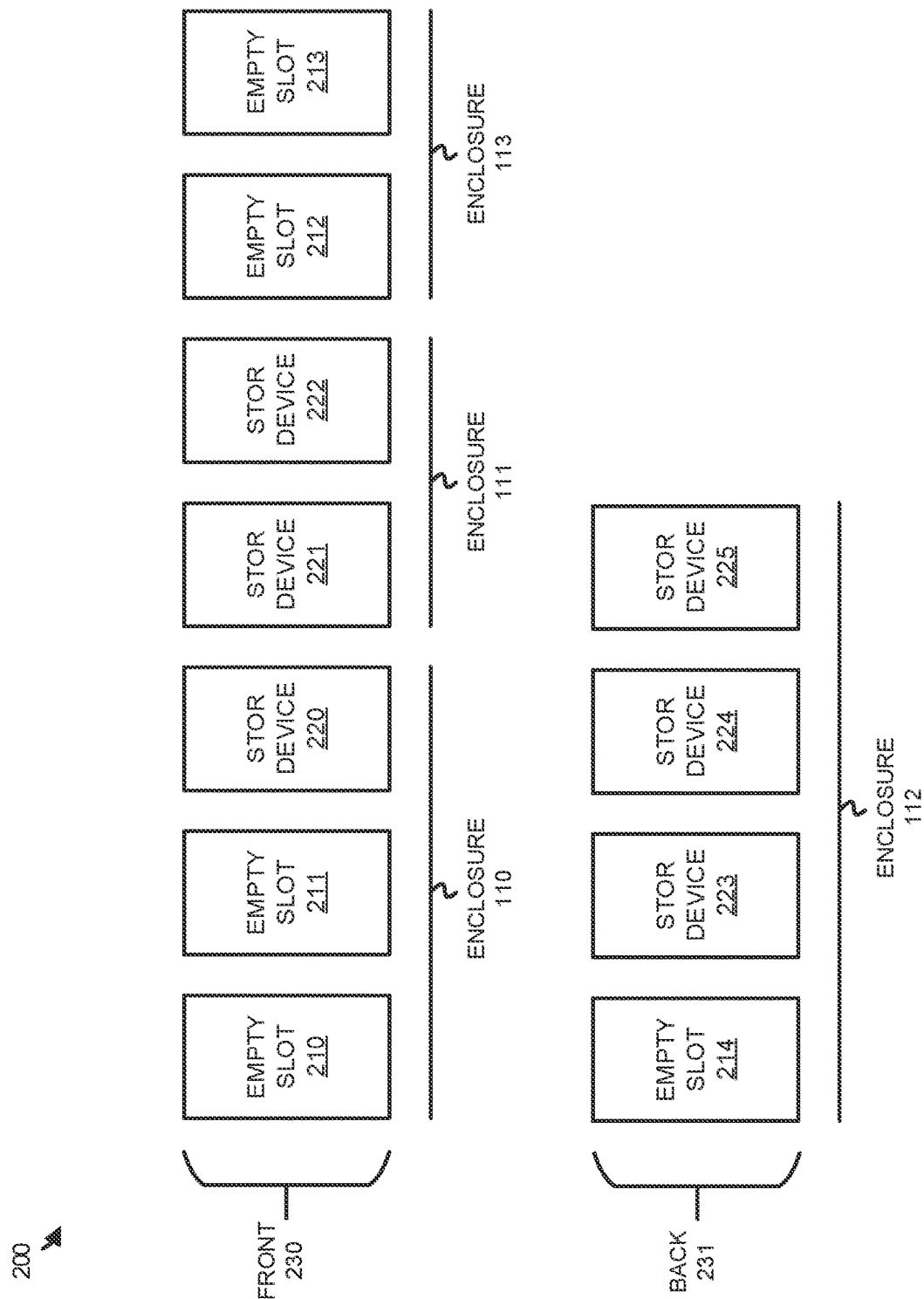
FIG. 2 illustrates a user interface to demonstrate physical resources for a software-defined storage environment according to an implementation.

FIG. 2 illustrates a user interface 200 to demonstrate physical resources for a software-defined storage environment according to an implementation. User interface 200 is representative of a display that can be provided via an administrative console for a computing environment. User interface 200 includes front 230 and rear 231 that are representative of available physical storage device locations on enclosures 110-113. User interface 200 further includes empty slots 210-214 and storage devices 220-222.

As described herein, the user interface service may obtain enclosure information associated with enclosures 110-113 and generate user interface 200 to provide a unified overview of the physical resources available for a software-defined storage environment. Here, user interface 200 indicates available storage device locations relative to each enclosure, wherein enclosure 110 includes three available storage device locations in the front, enclosure 111 includes two available storage device locations in the front, and enclosure 113 includes two available storage device locations in the front. Additionally, user interface 200 indicates that four available storage device locations are available in rear for enclosure 112. In addition to identifying the amount of storage device locations that are available on each of the enclosures, user interface 200 further indicates the available storage device locations that are occupied. For example, enclosure 110 includes empty slots 210-211 in the first two available storage device locations, while the third available storage device location is occupied by storage device 220. Advantageously, from this information, an administrator of the environment may identify available and occupied storage device locations in enclosures from a variety of vendors.

In some implementations, the user interface service may provide additional information about the storage devices and/or enclosures in the environment. The additional information may include enclosure type or vendor associated with the enclosure, vendor information associated with each of the storage devices, capacity information associated with the storage devices, or some other information associated with the storage devices. User interface 200 may further provide function information for the storage devices in relation to a software-defined storage configuration, wherein the software-defined storage configuration may include VMware vSAN™, Red Hat Ceph Storage™, or some other software-defined storage architecture. The software-defined storage configuration may be used to provide data for virtual machines or containers, may be used to support a database, or may be used in some other software-defined storage configuration. The function information may indicate how the storage device is being used in the storage configuration, such as for a capacity storage device or cache storage device, may indicate whether the storage device is available to be added to the configuration, or may provide some other information related to the storage device. In some examples, the function information may be derived from one or more hypervisors or a hypervisor management service associated with the computing environment.

In some implementations, user interface 200 may be manipulated by a user, wherein the user may select a storage device, enclosures, or other information of interest to the user. For example, a user may select a storage device and, in turn, be provided with additional information about the storage device, such as the manufacturer, the capacity, the uptime, the enclosure type hosting the storage device or some other information. Further, while demonstrated in the previous example as providing information about available storage in a computing environment, similar operations may be performed to provide information about physical network interfaces (PNICs), processing resources, memory resources, or some other resource available on each of the enclosures. The information may be gathered from the enclosures or may be identified at least in part using a database that provides information for the enclosure based on the enclosure type. As an example, the user interface service may identify an enclosure type for an enclosure in the computing environment. From the enclosure type, the user interface service may identify processing system information, available memory slots, physical network interface information, or some other information. In some implementations, the physical network interfaces may be reported from the enclosure, indicating the PNIC type, connection speed, location of the PNIC relative to the enclosure, or some other information associated with the PNIC.

Figure 3:
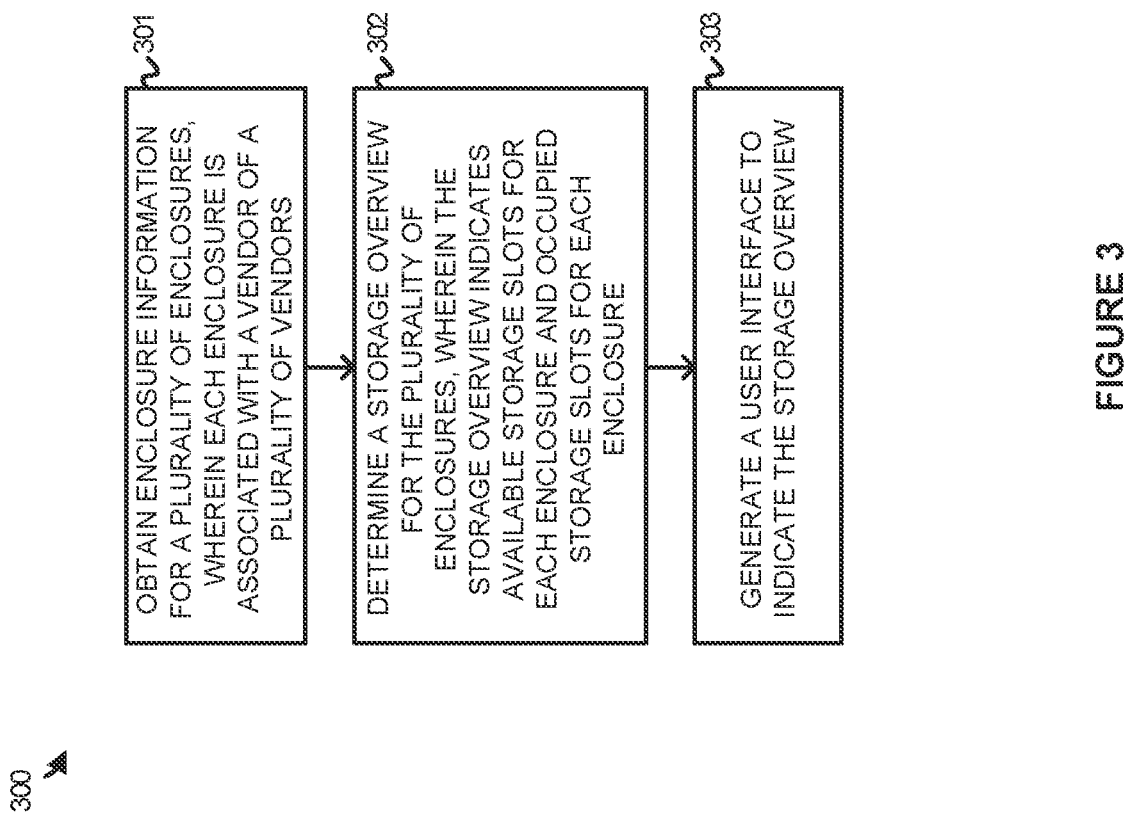
FIG. 3 illustrates an operation of a user interface service to generate a user interface of physical computing resources according to an implementation.

FIG. 3 illustrates an operation 300 of a user interface service to generate a user interface of physical computing resources according to an implementation. The steps of operation 300 are referenced parenthetically in the paragraphs that follow with reference to systems and elements of computing environment 100 of FIG. 1.

As depicted, operation 300 includes obtaining (301) enclosure information associated with a plurality of enclosures. In some implementations, the enclosures may be associated with different vendors, wherein each of the different vendors may be associated with different physical configurations of enclosures, different processing resources, or some other different configuration. In some examples, management service 120 may use one or more APIs to request and obtain resource information associated with the different enclosures and different vendors. The enclosure information may indicate an enclosure type for each of the enclosures, available storage slots for the enclosures, occupied storage slots for the enclosures, PNIC information for the enclosures, or some other information for the enclosures. For example, enclosure information for enclosure 110 may indicate the availability of three storage device slots at the front of the enclosure, wherein the third storage device slot is occupied by a storage device. In some implementations, in obtaining the enclosure information, user interface service 120 may obtain an enclosure type identifier from the enclosure and use a database to identify additional information associated with the enclosure, wherein the additional information may indicate processing resources for the enclosure, the location of available storage slots on the enclosure or some other information.

As the information is obtained, operation 300 further determines (302) a storage overview for the plurality of enclosures based on the enclosure information, wherein the storage overview indicates one or more available storage slots for each of the plurality of enclosures and occupied storage slots of the one or more available storage slots for each of the plurality of enclosures. In particular, the storage overview may indicate the storage slots on the plurality of enclosures and indicate whether each of the storage slots is occupied or empty. In some implementations, the storage overview may provide a unified context for the enclosures, independent from the different vendors associated with the enclosures. Operation 300 further generates (303) a user interface to indicate the storage overview, wherein the user interface may be displayed on a console computing system in some examples.

In some implementations, the user interface may include additional information about the enclosures. The additional information may include information about the available storage devices (manufacturer, capacity, etc.), information about enclosure (e.g., vendor, year, etc.), information about PNICs, or some other information. In some examples, the user interface may further include information about a software-defined storage configuration, wherein function information associated with each of the storage devices may be overlaid on representations of the storage devices in the user interface. The software defined storage may be representative of hyperconverged software-defined storage that can be used to provide a data store or pool for virtual machines (e.g., virtual machine disks). Examples of hyperconverged software-defined storage may include VMware vSAN™, Red Hat Ceph Storage™, or some other software-defined storage pool for virtual machines.

Figure 4:
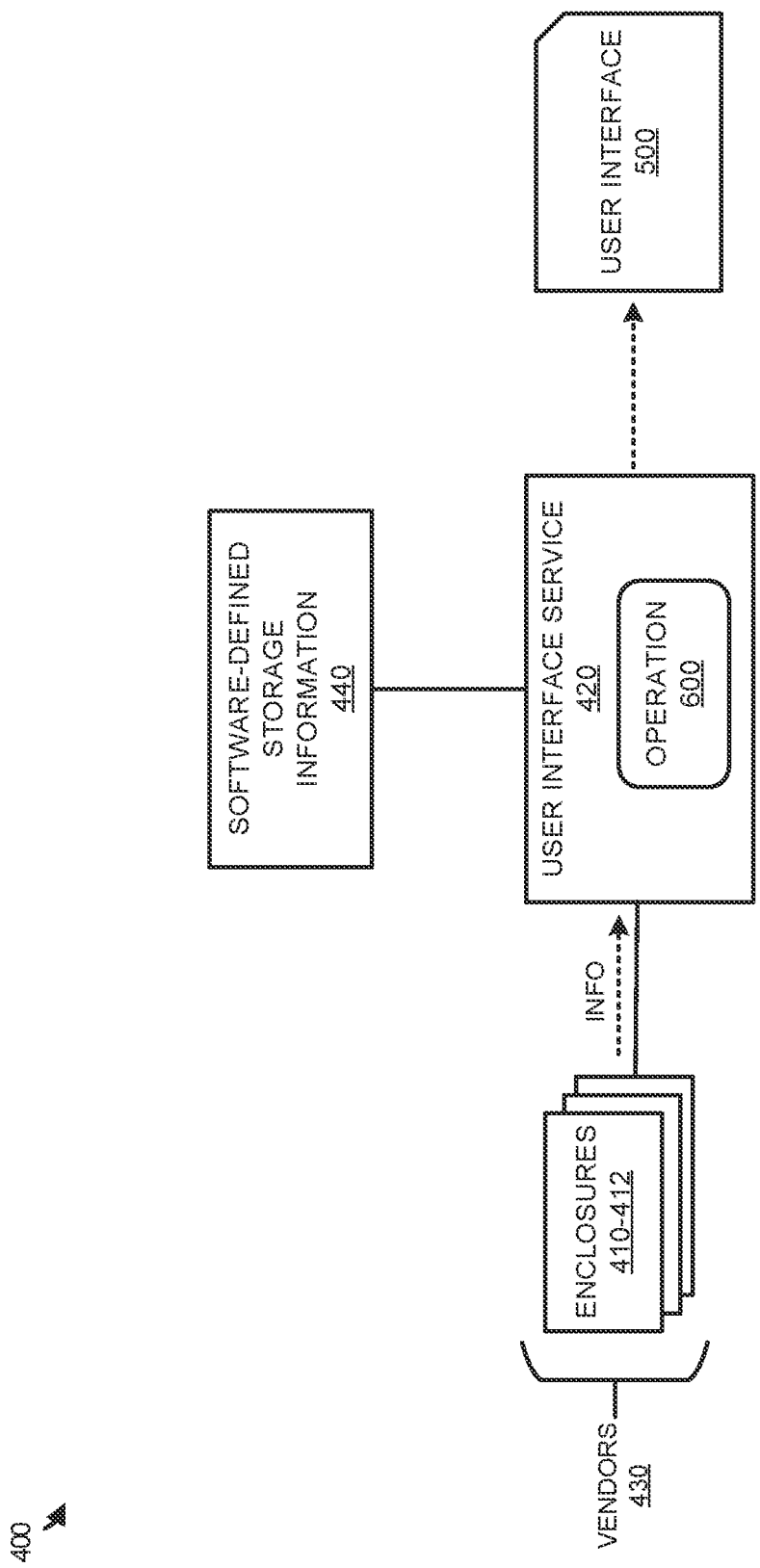
FIG. 4 illustrates a computing environment to generate a display of resources with function information associated with a software-defined storage environment according to an implementation.

FIG. 4 illustrates a computing environment 400 to generate a display of resources with function information associated with a software-defined storage environment according to an implementation. Computing environment 400 includes enclosures 410-412 from vendors 430, user interface service 420, software-defined storage information 440, and user interface 550. User interface service 420 provides at least operation 600 that is further described below in FIG. 6.

In operation, user interface service 420 obtains enclosure information associated with enclosures 410-412. The information may be obtained directly from the enclosures, may be obtained at least partially via input from an administrator, or may be supplemented with other information from one or more databases that include information for the enclosures. The information may include the vendor associated with the enclosure, a type identifier for the enclosure, a number of available storage slots, a number of occupied storage slots, processing system information, PNIC information, or some other information about the enclosure. In addition to the enclosure information, user interface service 420 may obtain configuration information from software-defined storage information 440, wherein the information may comprise a function for each storage device in enclosures 410-412. The function may indicate whether the storage device is allocated to a storage pool, whether the storage device is able to be allocated to the storage pool, whether the storage device provides caching or capacity for the configuration or may provide some other function associated with the storage device in the software-defined storage configuration.

Once the information is obtained about the physical resources and the software-defined storage configuration, user interface service 420 generates user interface 500. The user interface may be used to indicate at least information about the available physical resources in conjunction with software-defined storage configuration information. In some implementations, user interface 500 may comprise visual representations of the available storage slots for each enclosure of enclosures 410-412, indicate which of the storage slots are occupied, and provide a function for each of the occupied storage slots in relation to the software-defined storage configuration.

Figure 5:
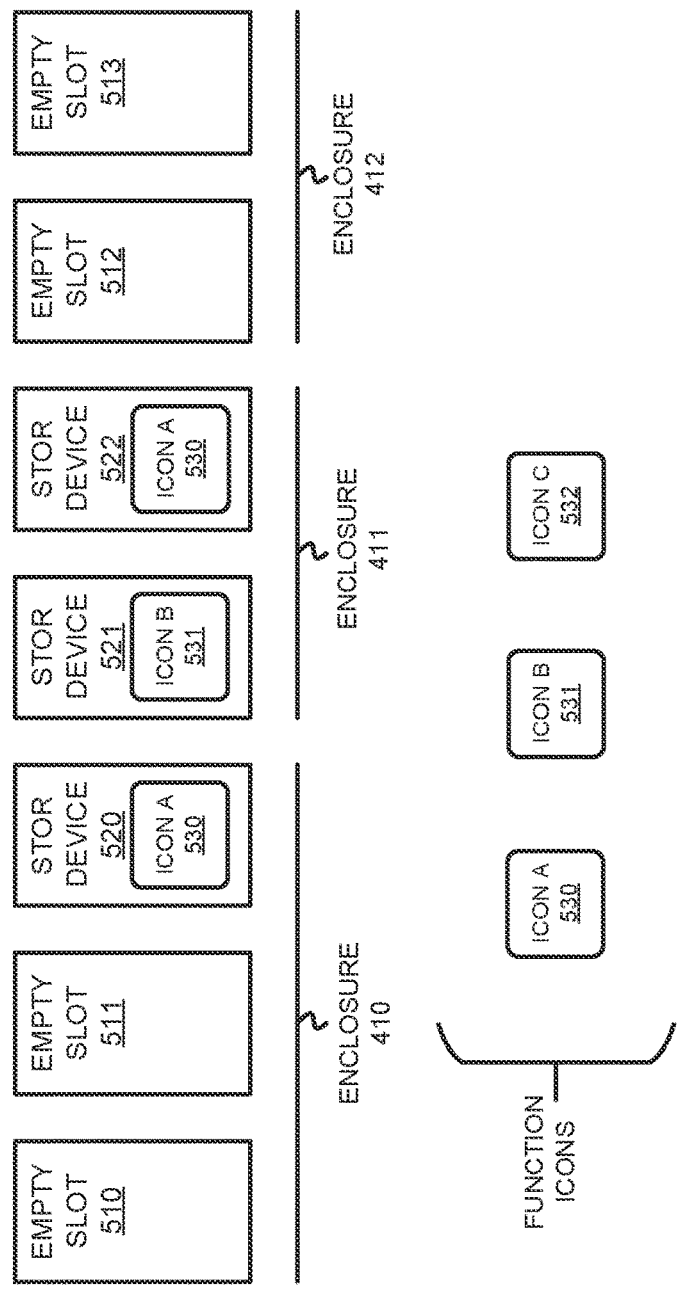
FIG. 5 illustrates a user interface to demonstrate physical resources and function information for a software-defined storage environment according to an implementation.

FIG. 5 illustrates a user interface 500 to demonstrate physical resources and function information for a software-defined storage environment according to an implementation. User interface 500 is an example user interface that can be generated by user interface service 420. User interface 500 includes empty storage slots 510-513 and storage devices 520-522 that are available on enclosures 410-412. User interface 500 further includes icons 530-532 that indicate a function of the storage devices in relation to a software-defined storage configuration.

As described herein, user interface service 420 obtains enclosure information that represents physical resources available on enclosures 410-412 and further determines a function associated with the storage devices provided by the enclosures. Here, user interface service 420 generates user interface 500 that includes visual representations of the available storage device slots, the storage device slots that are occupied by storage devices 520-522, and an overlaid function associated with each of storage devices 520-522. The function may indicate that the storage device is available to be claimed for the storage pool, that the storage device is used for a cache, that the storage device is used for capacity, that the storage device is unavailable to be used with the pool, or some other function information associated with the storage device. Here, the function information is provided as an icon overlaid on the associated storage device, however, it should be understood that the function information may be provided in any other manner, including text, highlights, or some other function indication.

In some implementations, user interface 500 may provide additional information about the physical resources available for the various enclosures. The additional information may include vendors or manufacturers associated with each of the drives, may include capacities associated with the drives, or may comprise some other information in association with the drives and/or the enclosure for the drives. In some examples, a user may select one or more drives or enclosures of interest and the user interface service may provide additional information for the objects selected. The additional information may include popup bubbles, a second window in user interface 500, or some other mechanism to provide information about the selected object in the user interface. Although demonstrated in the example of user interface 500 using storage storage devices and available slots, user interface 500 may further provide information about available PNICs, processing systems, occupied and non-occupied memory slots, or some other information. This additional enclosure information may be obtained entirely using the one or more APIs associated with the vendors or may be obtained at least partially using a database that can identify physical resource attributes based on enclosure type identifier information from the different enclosures.

Although user interface 500 is one example of providing visual information to a user, it should be understood that the enclosure information in conjunction with the software-defined storage information may be provided in other visual means. These visual means or alternative interfaces may include a data structure, such as a table, that indicates the availability of physical resources and the software-defined storage function information for the physical resources, a three-dimensional illustration of the physical resources in conjunction with the software-defined storage function information, or some other user interface.

Figure 6:
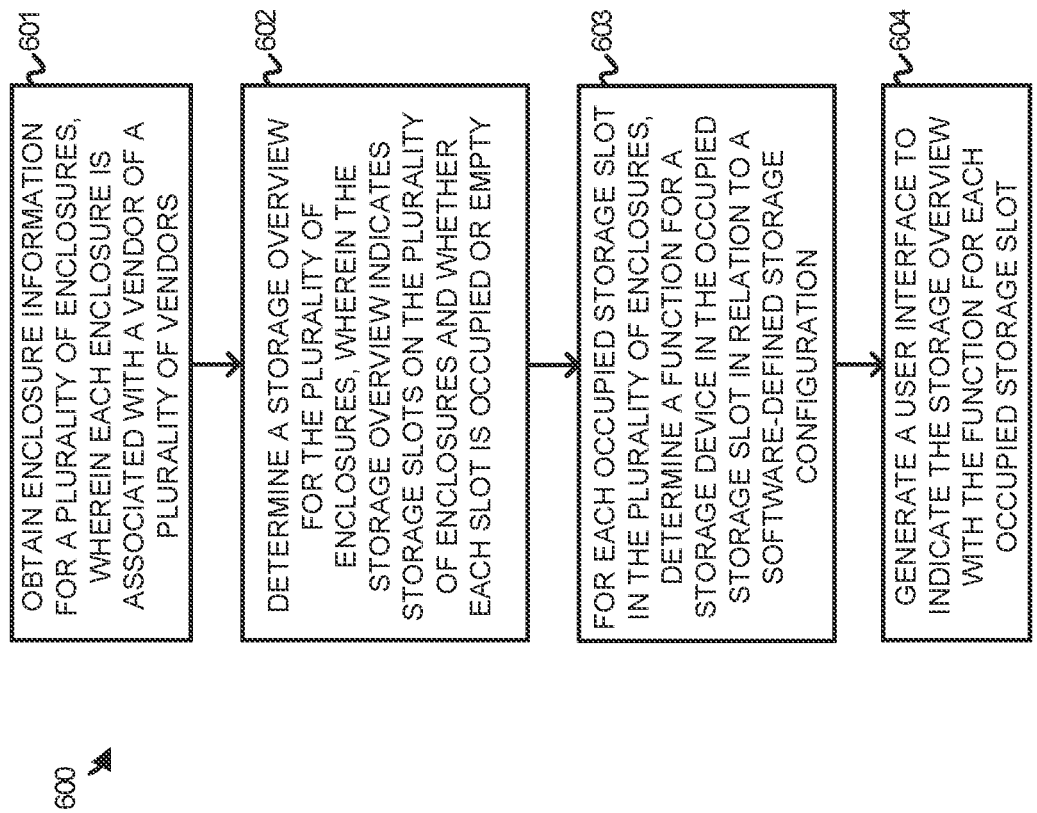
FIG. 6 illustrates an operation of a user interface service to generate a user interface of physical resources in relation to function information associated with a software-defined storage environment according to an implementation.

FIG. 6 illustrates an operation 600 of a user interface service to generate a user interface of physical resources in relation to function information associated with a software-defined storage environment according to an implementation. The steps of operation 600 are referenced parenthetically in the paragraphs that follow with reference to systems and elements of computing environment 400 of FIG. 4.

As depicted, operation 600 includes obtaining (601) enclosure information associated with a plurality of enclosures, wherein the enclosures may correspond to a plurality of vendors in some examples. The enclosure information may be obtained directly from the enclosures or may be supplemented at least in part using a database that can identify information for an enclosure using a database that provides additional information based on an identifier for the enclosure. Operation 600 further determines (602) a storage overview for the plurality of enclosures based on the enclosure information, wherein the storage overview indicates storage slots on the plurality of enclosures and whether each of the storage slots is occupied or empty. This storage overview may comprise a unified structure or format, such as a table, array, and the like that indicates at least the available storage slots and the occupied storage slots for each of the enclosures independent of the vendor for the enclosure. The storage overview may further indicate PNIC information, processing system information, or some other information associated with the enclosure.

In addition to the storage overview, operation 600 further determines (603), for each occupied storage slot in the plurality of enclosures, a function for a storage device in the occupied storage slot in relation to a software-defined storage configuration. In some implementations, the user interface service may communicate with hypervisors or a hypervisor management service to obtain software-defined storage configuration information associated with the computing environment. The user interface service may also communicate with one or more data structures or services that maintain information about the allocation of physical resources for the software-defined storage configuration. In some examples, the function information may identify the storage device, how the storage device is used for the configuration, whether the storage device is claimed or available for the software-defined storage configuration, or some other function information. In some implementations, the software defined storage is representative of hyperconverged software-defined storage that can be used to provide a data store or pool for virtual machines (e.g., virtual machine disks). Examples of hyperconverged software-defined storage may include VMware vSAN™, Red Hat Ceph Storage™, or some other software-defined storage pool for virtual machines.

Once the storage overview and the function information are determined, the user interface service generates (604) a user interface to indicate the storage overview with the function for each occupied storage slot in the plurality of enclosures. In some implementations, the user interface may comprise visual representations of each of the available storage slots with visual representations of storage devices in the occupied storage slots. Additionally, the user interface may include function information for each of the storage devices overlaid on the storage devices, wherein the function information may be represented as text, icons, colors, or some other overlay on the occupied storage slots.

In some examples, in addition to the information provided about the storage slots for each of the enclosures, the user interface may provide additional information associated with each of the enclosures. The information may correspond to PNICs, processors, or some other resource provided by the enclosure. In some examples, a user may select one or more visual representations of physical resources in the computing environment and be provided with additional information about the resource. The additional information may include a vendor, a storage capacity in the case of a storage device, the life cycle of the device, or some other information associated with the selected component. The information may appear overlaid with the selected component or may appear in a second window or portion of the user interface.

Figure 7:
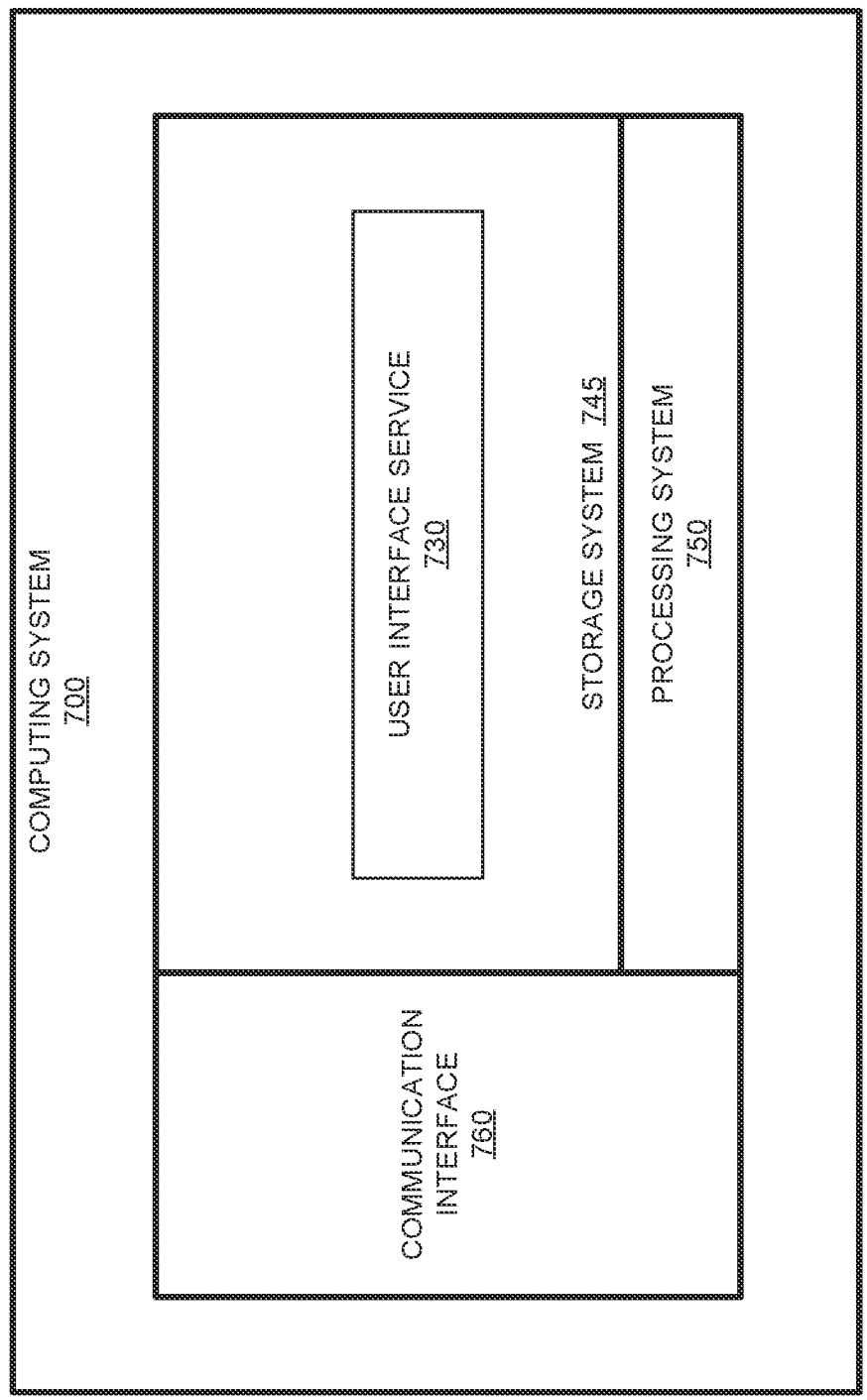
FIG. 7 illustrates a computing system to generate user interfaces indicative of available physical resources and a software-defined storage environment deployed on the available physical resources according to an implementation.

FIG. 7 illustrates a computing system 700 to generate user interfaces indicative of available physical resources and a software-defined storage environment deployed on the available physical resources according to an implementation. Computing system 700 is representative of any computing system or systems with which the various operational architectures, processes, scenarios, and sequences disclosed herein for a user interface service can be implemented. Computing system 700 is an example of user interface service 120 of FIG. 1 and user interface service 420 of FIG. 4, although other examples may exist. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 may be configured to communicate with enclosures in a computing environment, wherein the enclosures may include processing resources, storage resources, PNIC resources, or some other physical resource to the computing environment. In some implementations, communication interface 760 may communicate with one or more computing systems of administrators of the computing environment to provide the display of the physical resources and software-defined storage configuration.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises user interface service 730 that can provide at least operations 300 and 600 of FIGS. 3 and 6, respectively. The operating software on storage system 745 may further include an operating system, utilities, drivers, network interfaces, applications, or some other type of software. When read and executed by processing system 750 the operating software on storage system 745 directs computing system 700 to operate as described herein.

In at least one implementation, user interface service 730 directs processing system 750 to obtain enclosure enclosure information associated with a plurality of enclosures, wherein the enclosures may be associated with one or more vendors. In some implementations, user interface service 730 may use one or more API associated with the vendors to obtain the enclosure information. The enclosure information may include an enclosure identifier, a list of the available storage slots, a list of occupied storage slots, location information for the storage slots relative to the enclosure, or some other enclosure information. In some examples, at least a portion of the enclosure information may be identified using a database maintained for user interface service 730. In particular, user interface service 730 may obtain an identifier for an enclosure in the computing environment. Once the identifier is obtained, user interface service 730 may search a database using the identifier to determine additional enclosure information associated with the enclosure, such as the location of the available storage slots for the enclosure. After obtaining the enclosure information, user interface service 730 directs processing system 750 to determine a storage overview for the plurality of enclosures based on the enclosure information, wherein the storage overview indicates one or more available storage slots for each of the plurality of enclosures and occupied storage slots of the one or more storage slots for each of the plurality of enclosures. This storage overview may comprise a unified storage view that provides storage information for the various enclosures independent of the vendor or type of enclosure. The storage overview may comprise one or more tables, linked lists, or other data structures that can be used to identify that enclosure, available storage slots, occupied storage slots in the available storage slots, or some other information associated with each of the enclosures.

Once the enclosure information is obtained, user interface service 730 may further direct processing system 750 to determine, for each occupied storage slot, a function for the storage device in the occupied storage slot in relation to a software-defined storage configuration. In some examples, an organization may use software-defined storage to provide a pool of storage across one or more physical enclosures for virtual machines, containers, databases, or some other function. User interface service 730 may communicate with one or more administrative services for the software-defined storage configuration to obtain information about how each of the occupied storage slots is being used in the configuration. The administrative services may comprise one or more hypervisors, a hypervisor management service, or some other service that manages the software-defined storage configuration. The function for each of the storage devices in the occupied storage slots may indicate whether the storage device is a capacity storage device for the configuration, a cache storage device for the configuration, a storage device ineligible to be added to the storage pool, or an unclaimed storage device available to the storage pool.

After determining the enclosure information and the function for occupied storage slots in the enclosures, user interface service 730 directs processing system 750 to generate a user interface to indicate the storage overview with the function for each occupied storage slot in the plurality of enclosures. In some implementations, the user interface may include visual representations of each enclosure with available storage slots for each of the enclosures. The visual representation may further indicate which of the available storage slots are occupied and overlay function information on the occupied storage slots. The function information may be represented as one or more icons, text, color, or some other representation in the user interface.

In some implementations, the user interface may provide additional information about the enclosures, such as the location of the available storage slots (i.e., front or back of the enclosure), PNIC availability on each of the enclosures, processing system information, memory information, or some other information corresponding to the enclosures of the computing environment. In at least one example, a user may select different elements in the user interface to obtain additional information about the element. For example, a user may select a storage device and user interface service 730 may provide additional information about the storage device, such as a vendor associated with the storage device, capacity of the storage device, type of storage device (solid-state, mechanical hard disk, etc.), or some other information for the storage device. In some implementations, the additional information for the selected element may be obtained using API requests to the corresponding enclosure and may be obtained prior to the request from the user.

In some implementations, the software-defined storage configuration information may be omitted from the user interface, permitting a user to view the available hardware resources without the software-defined resource information. In some examples, a user may request that the software-defined resource information be overlaid on the user interface with the physical resources.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   obtaining enclosure information associated with a plurality of enclosures;
   determining a storage overview for the plurality of enclosures based on the enclosure information, wherein the storage overview indicates storage slots on the plurality of enclosures and whether each of the storage slots is occupied or available;
   for each occupied storage slot in the plurality of enclosures, determining a function from a plurality of functions for a storage device in the occupied storage slot in relation to a software-defined storage configuration, wherein the software-defined storage configuration provides a storage pool for virtual machines, and wherein the plurality of functions comprises a capacity storage device, a cache storage device, an unclaimed storage device, and an ineligible storage device; and
   generating a user interface to indicate the storage overview with the function for each occupied storage slot in the plurality of enclosures.

2. The method of claim 1 further comprising:
   determining a physical network interface overview for the plurality of enclosures based on the enclosure information; and
   wherein the user interface further indicates the physical network interface overview.

3. The method of claim 1, wherein obtaining the enclosure information comprises:
   obtaining the enclosure information using one or more Application Programming Interfaces (APIs) associated with a plurality of vendors.

4. The method of claim 1, wherein the storage overview further indicates a location associated with each of the storage slots on the plurality of enclosures.

5. The method of claim 4, wherein the location indicates the storage slot is in a front location or a rear location of a corresponding enclosure of the plurality of enclosures.

6. The method of claim 4, wherein each enclosure is associated with a vendor of a plurality of vendors.

7. The method of claim 1, wherein the user interface comprises visual representations of the storage slots for the plurality of enclosures, and wherein the user interface overlays the function for each occupied storage slot over a corresponding visual representation of the occupied storage slot.

8. A computing apparatus comprising:
   a storage system;
   a processing system operatively coupled to the storage system; and
   program instructions stored on the storage system that, when executed by the processing system, direct the computing apparatus to:
      obtain enclosure information associated with a plurality of enclosures;
      determine a storage overview for the plurality of enclosures based on the enclosure information, wherein the storage overview indicates storage slots on the plurality of enclosures and whether each of the storage slots is occupied or empty;
      for each occupied storage slot in the plurality of enclosures, determine a function from a plurality of functions for a storage device in the occupied storage slot in relation to a software-defined storage configuration, wherein the software-defined storage configuration provides a storage pool for virtual machines, and wherein the plurality of functions comprises a capacity storage device, a cache storage device, an unclaimed storage device, and an ineligible storage device; and
      generate a user interface to indicate the storage overview with the function for each occupied storage slot in the plurality of enclosures.

9. The computing apparatus of claim 8, wherein the program instructions further direct the computing apparatus to:
   determine a physical network interface overview for the plurality of enclosures based on the enclosure information; and
   wherein the user interface further indicates the physical network interface overview.

10. The computing apparatus of claim 8, wherein obtaining the enclosure information comprises:
    obtaining the enclosure information using one or more Application Programming Interfaces (APIs) associated with the plurality of enclosures.

11. The computing apparatus of claim 8, wherein the storage overview further indicates a location associated with each of the storage slots on the plurality of enclosures.

12. The computing apparatus of claim 11, wherein the location indicates the storage slot is in a front location or a rear location of a corresponding enclosure of the plurality of enclosures.

13. The computing apparatus of claim 11, wherein the enclosure information comprises an enclosure type for each enclosure of the plurality of enclosures and wherein the storage overview is further based on a database that indicates a front or rear location for storage slots from the enclosure type for each enclosure of the pularity of enclosures.

14. The computing apparatus of claim 8, wherein the user interface comprises visual representations of the storage slots for the plurality of enclosures, and wherein the user interface overlays the function for each occupied storage slot over a corresponding visual representation of the occupied storage slot.

15. The computing apparatus of claim 8, wherein each enclosure of the plurality of enclosures is associated with a vendor of a plurality of vendors.

16. An apparatus comprising:

a storage system;

program instructions stored on the storage system that, when executed by a processing system, direct a computing apparatus to:

obtain enclosure information associated with a plurality of enclosures;

determine a storage overview for the plurality of enclosures based on the enclosure information, wherein the storage overview indicates storage slots on the plurality of enclosures, whether each of the storage slots is occupied or empty, and locations of the of the storage slots on the plurality of enclosures;

for each occupied storage slot in the plurality of enclosures, determine a function from a plurality of functions for a storage device in the occupied storage slot in relation to a software-defined storage configuration, wherein the software-defined storage configuration provides a storage pool for virtual machines; and generate a user interface to indicate the storage overview with the function for each occupied storage slot in the plurality of enclosures.

17. The apparatus of claim 16, wherein the function comprises one of a capacity storage device, a cache storage device, an unclaimed storage device, or an ineligible storage device for the software-defined storage configuration.

18. The apparatus of claim 17, wherein the user interface comprises visual representations of the storage slots for the plurality of enclosures, and wherein the user interface overlays the function for each occupied storage slot over a corresponding visual representation of the occupied storage slot.

* * * * *